United States Patent
Taskett

[11] Patent Number: 5,988,509
[45] Date of Patent: *Nov. 23, 1999

[54] REFUNDABLE PREPAID TELEPHONE CARD

[75] Inventor: John M. Taskett, Salt Lake, Utah

[73] Assignee: American Express TRS, New York, N.Y.

[ * ] Notice: This patent is subject to a terminal disclaimer.

[21] Appl. No.: 08/906,735

[22] Filed: Aug. 6, 1997

Related U.S. Application Data

[63] Continuation of application No. 08/458,715, Jun. 1, 1995, Pat. No. 5,684,291.

[51] Int. Cl.⁶ .................................................. G06K 19/00
[52] U.S. Cl. .......................... 235/487; 235/380; 235/379
[58] Field of Search .................................. 235/380, 379, 235/487; 283/72, 74, 75, 100, 103, 105, 108; 395/239; 705/39, 23, 43; 379/144, 114, 67

[56] References Cited

U.S. PATENT DOCUMENTS

| | | | |
|---|---|---|---|
| 5,101,098 | 3/1992 | Naito | 235/380 X |
| 5,353,335 | 10/1994 | D'Urso et al. | 379/67 |
| 5,577,109 | 11/1996 | Stimson et al. | 379/114 X |

FOREIGN PATENT DOCUMENTS

| | | |
|---|---|---|
| 0 622 942 A2 | 11/1994 | European Pat. Off. . |
| 36 12 507 A1 | 10/1987 | Germany . |
| 2 252 270 | 8/1992 | United Kingdom . |
| WO 94/16415 | 7/1994 | WIPO . |
| WO 95/12169 | 5/1995 | WIPO . |

*Primary Examiner*—Donald Hajec
*Assistant Examiner*—Karl D. Frech
*Attorney, Agent, or Firm*—Snell & Wilmer L.L.P.

[57] ABSTRACT

A prepaid transaction instrument, such as a prepaid telephone card, comprises an identification code for use by a consumer in gaining access to a prepaid telephone account associated with the identification code and a replacement code related to the identification code according to a secret relationship maintained by the issuer of the card. The replacement code may be printed on a separate and distinct document from the identification code or may be printed on the same document as the identification code, but on a separable portion of the document. If the consumer loses the prepaid card, the issuer of the prepaid card issues a replacement card to the consumer when provided with the replacement code by the consumer.

23 Claims, 2 Drawing Sheets

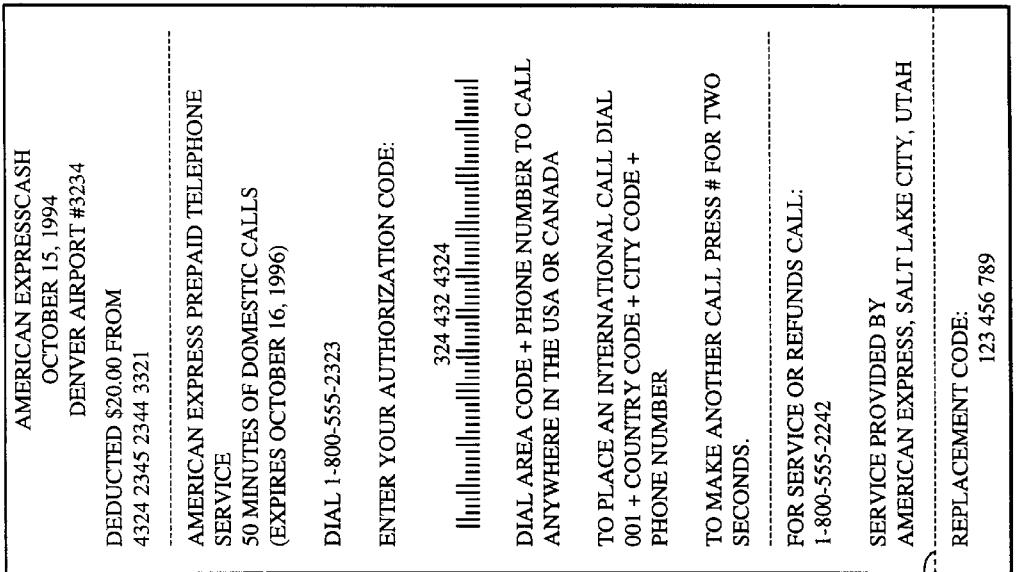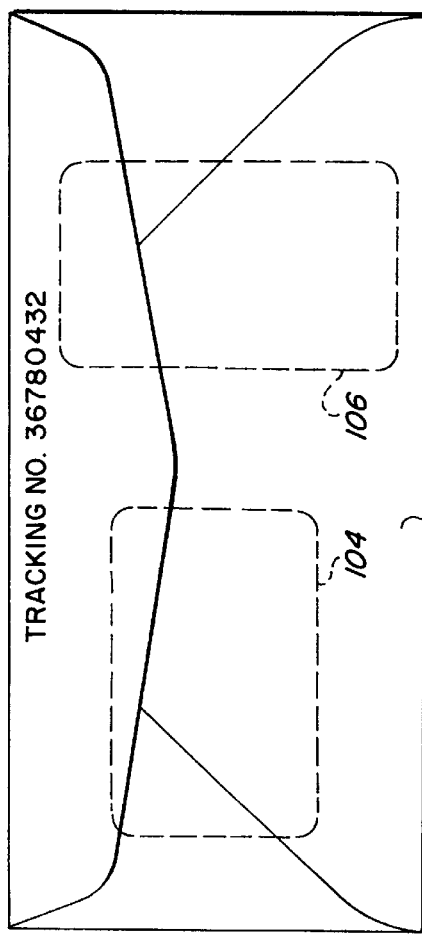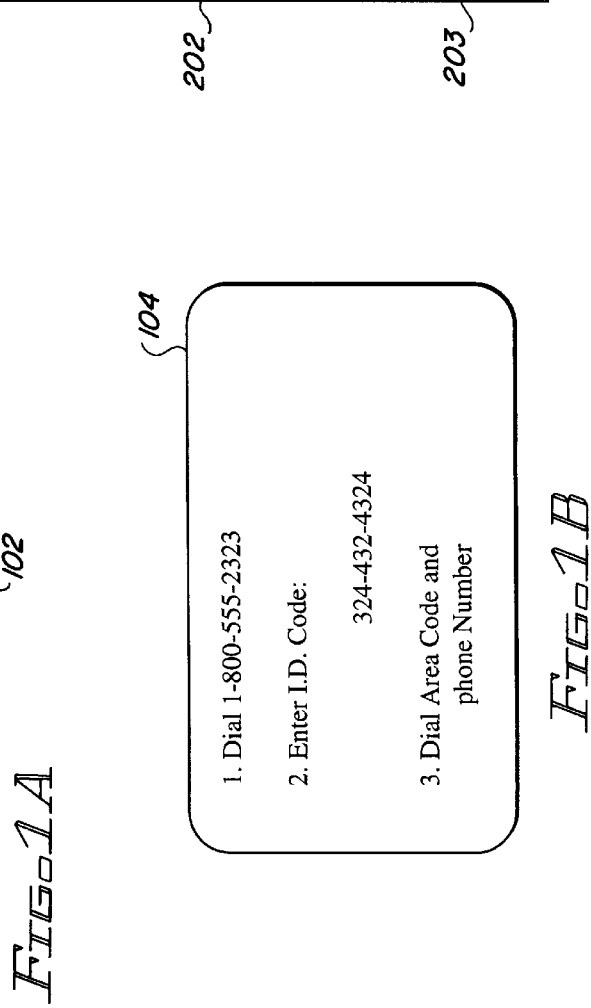

REFUNDABLE PREPAID TELEPHONE CARD

This is a continuation of U.S. Ser. No. 08/458,715 filed on Jun. 1, 1995 now U.S. Pat. No. 5,684,291.

TECHNICAL FIELD

The present invention relates, generally, to a system and method for securely issuing prepaid instruments such as prepaid telephone calling cards which can be replaced if lost or stolen, and more particularly to a prepaid card which bears an authorization code (account ID code), which card is issued along with a second document containing a replacement code to be employed by the customer to report a lost or stolen prepaid card.

BACKGROUND ART AND TECHNICAL PROBLEMS

Prepaid credit instruments are generally well known. Prepaid, remote memory telephone cards are particularly prevalent in a variety of forms, including promotional brochures, wallet-sized cardboard and plastic cards, and the like.

A prepaid telephone card typically has printed thereon the information necessary to effect long distance telephone calls. In particular, a typical prepaid telephone card includes an access telephone number, for example an 800 number, used to access the prepaid calling system. The card also includes a unique authentication code or ID code which is used to access a particular account, which account is usually stored in a remote database resident at the prepaid calling card service provider. Finally, the card includes instructions for placing long distance calls, whether domestic or international.

Such prepaid cards are typically sold in predetermined denominations, for example $5, $10, $20, $50, and the like. Moreover, such cards are often sold at convenience stores and other retail outlets, much like lottery tickets are sold. That being the case, it would be prohibitively expensive for many retail shops, particularly low dollar volume merchants, to purchase a large number of cards from an issuer and maintain them in inventory until the cards are purchased at retail by consumers. To accommodate these merchants, issuers routinely provide merchants with batches of cards, but do not activate a particular card until the card is actually sold, at which time the merchant incurs a payment obligation to the issuer. This protects the merchant from having to pay in advance for a large number of cards which may not be sold for quite some time, or even not at all.

By placing these cards in the possession of the merchant prior to receipt of payment from the merchant, however, the issuer runs the risk of merchant fraud. For example, if a merchant is in possession of prepaid cards which the merchant has not paid for, it would be theoretically possible for the merchant to use the ID numbers on the cards or divulge these ID numbers to third parties and thereby defraud the issuer.

To protect the issuer from fraudulent activity by merchants or other persons in the distribution chain, many prepaid cards are packaged in an envelope which masks the ID code, or in a manner which otherwise obscures the ID code until such time as the card is purchased by a consumer; at the time of purchase, the card is "activated", for example by having the merchant dial up the issuer's host computer, indicating that the card has been purchased by a consumer and effecting activation of the card at the host computer.

For example, a popular method of distributing prepaid cards involves printing, among other things, a unique ID code on the face of a card, and placing the card in a sealed envelope at the issuer or manufacturer. A tracking number is printed on the outside of the sealed envelope. In some distribution schemes, the tracking number is cryptographically related to the ID code, with the issuer holding the cryptographic key. In this way, when the issuer is informed of the tracking number by the merchant at the time of sale of a card to a consumer, the issuer may derive the ID code corresponding to that card and activate the corresponding account. Alternatively, the tracking number and ID code may be related through a look up table or relational database maintained by the issuer's host computer.

Once a consumer has purchased a card from a merchant and the merchant facilitates activation of the card through communication with the card issuer, responsibility for theft or loss of the card typically is shifted to the consumer. For example, if the consumer loses his card or it is stolen, one might argue that the consumer could call the issuer and report the card as having been lost or stolen, and request the issuer to deactivate the account, thereby preventing fraud. While this is certainly true, the issuer would not be in a position to reissue a new number to the consumer or to otherwise provide credit to the consumer for the lost card. This is because the thief or finder of the lost card would also have access to the ID code, since the ID code is printed on the face of the card. Consequently, the thief or finder of the lost card could simply call the issuer and report the card as lost or stolen, relate the ID code to the issuer, and request a refund or a new ID code. Thus, replacement or reimbursement schemes predicated on the knowledge of the ID code printed on the face of the card are impractical.

It has also been suggested that the consumer could maintain a record of the tracking number associated with the card, inasmuch as the thief or finder of a card will have access to the ID code, but not to the tracking number. Thus, it might be argued, the consumer should be able to contact the issuer and report a card as lost or stolen, requesting credit or reimbursement based on the tracking number from which the issuer can derive or otherwise determine the ID code and/or account number. This approach, however, is also flawed inasmuch as it subjects the issuer to merchant fraud.

More particularly, the tracking number, being printed on the outside of the envelope within which the calling card is sealed prior to sale, is readily available to the merchant; indeed, the merchant must typically use the tracking number in order to activate the account for a particular card at the time the card is sold. Hence, reimbursement, credit, or replacement schemes predicated on knowledge of the tracking number are also impracticable.

A secure system for issuing prepaid telephone and other type instruments is thus needed which overcomes the limitations of the prior art, particularly as regards the issuer's ability to securely provide replacement, credit, or reimbursement in respect of lost or stolen cards.

SUMMARY OF THE INVENTION

A secure means for issuing prepaid telephone cards and other instruments is provided which overcomes many of the shortcomings associated with prior art schemes. In particular, the present invention provides a scheme which permits an issuer of prepaid instruments to securely provide a credit, replacement, or reimbursement to a purchaser of a lost or stolen prepaid instrument.

In accordance with one aspect of the present invention, a prepaid, remote memory card is provided which includes instructions for gaining access to prepaid goods or services. In accordance with a preferred embodiment of the invention, these instructions are in the form of a telephone number for accessing a prepaid telephone account service provider network, a unique ID code associated with a particular card and, hence, associated with a particular prepaid telephone account, and instructions for dialing domestic and/or international telephone calls which are to be debited against the prepaid account. In accordance with a further aspect of the invention, at the time of purchase of the prepaid card the customer is also provided with a second, replacement code which is advantageously associated with the ID code on the card. In a preferred embodiment, the replacement code is printed on a document or instrument which is physically distinct from or separable from the card, instrument, or document upon which the ID code is printed. Both the card (bearing the ID code) and the associated document (bearing the replacement code) are sold together, preferably in a manner which obscures one or both numbers from the merchant, for example by distributing both the card and the replacement instrument in a single, sealed envelope or other secure package. In accordance with an alternate embodiment of the present invention, both the ID code and replacement code are printed on a single receipt dispensed from an ATM machine or POS terminal, such that the replacement code portion of the instrument may be detached from the portion of the instrument bearing the ID code.

By physically decoupling the replacement code from the ID code, a consumer may report the theft or other loss of a prepaid card based solely on the replacement code; significantly, the thief or finder of the lost card would thus be unable to obtain credit, reimbursement, or replacement inasmuch as he will not have access to the replacement code. Moreover, by obscuring the replacement code from the merchant, for example by placing the replacement code in a sealed envelope, masking the replacement code with a scratch off layer, or other such security means, the issuer is substantially insulated from merchant theft.

In accordance with a further aspect of the present invention, a third tracking number which is related to one or both of the ID code and/or replacement code may also be placed on the outside of the sealed envelope or in a manner otherwise readable by the merchant, to permit the merchant to activate an account at the time a card is purchased by a consumer.

In accordance with an alternate embodiment of the present invention, a prepaid telephone card is suitably equipped with a local memory mechanism, such that the remaining balance in the account associated with the card, as well as other important information, may be conveniently encoded into a memory mechanism on the card. For example, a microprocessor or a ram may be embedded into the card, for example as is known in the context of "smart cards", which may serve as a local memory. Alternatively, a mechanic strip may be used to mechanically encode information pertaining to the account directly onto the card.

BRIEF DESCRIPTION OF THE DRAWING FIGURES

The present invention will hereinafter be described in conjunction with the appended drawing figures, wherein like numerals denote like elements, and:

FIG. 1A is a schematic front elevation view of a sealed envelope containing a prepaid card and replacement instrument, shown in phantom within the sealed envelope in accordance with one aspect of the present invention;

FIG. 1B is a detailed view of the prepaid card of FIG. 1;

FIG. 2 is an exemplary combined prepaid card/replacement card of the type printed by an ATM machine in accordance with an alternate embodiment of the present invention;

DETAILED DESCRIPTION OF PREFERRED EXEMPLARY EMBODIMENTS

Referring now to FIG. 1, a secure system for issuing prepaid instruments suitably comprises a prepaid calling card 104 and a separate replacement document 106, both advantageously secured within a sealed envelope 102. In this context, it is envisioned that a plurality of sealed envelopes similar to envelope 102 would be provided by the issuer of the prepaid telephone cards to each merchant, which merchants thereafter distribute the prepaid cards to consumers on behalf of the issuer. Each time a merchant sells an envelope 102 to a consumer, the merchant may effect activation of the account corresponding to the card, for example by communicating the tracking number which may appear on the outside of the envelope to the issuer, whereupon the issuer host computer activates the account. Alternatively, a merchant could simply purchase envelopes from the issuer, whereupon each respective account would be activated at the time the merchant purchases the cards from the issuer; this would avoid the need to activate the cards at the time of sale. This could be particularly advantageous, for example, in the context of vending machine sales where postsale activation would be cumbersome.

In accordance with a further aspect of the present invention, prepaid card 104 suitably includes all the information necessary to allow a consumer to draw upon the prepaid account. In the context of the preferred embodiment set forth herein, the account corresponds to a prepaid long distance telephone account, and the prepaid instrument corresponds to a prepaid long distance telephone calling card. However, it will be appreciated that the present invention is not so limited; for example, virtually any type of prepaid arrangement may be affected through the use of the scheme discussed herein, including prepaid goods and services of virtually any kind. In this regard, the "goods" may relate to data and information which may be sold through data networks, telephone networks, or even the Internet.

Figure 1C:
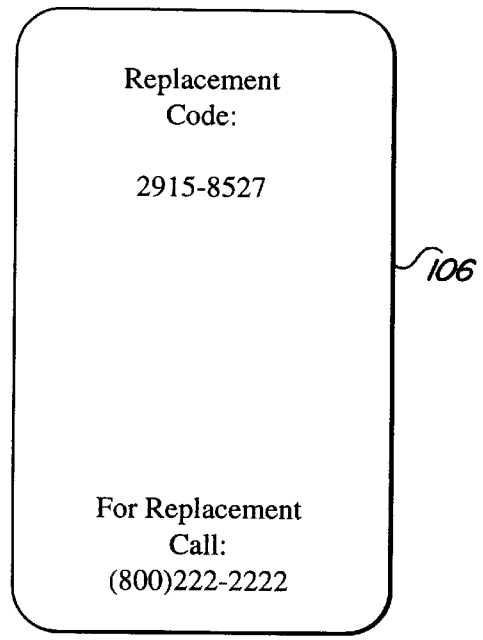
FIG. 1C is a detailed view of the replacement instrument shown in FIG. 1.

With particular reference to FIGS. 1B and 1C, prepaid instrument 104 suitably has printed thereon a telephone number by which a consumer may access the service network operated by the service provider. Upon dialing the access telephone number (e.g., an 800 telephone number), the consumer enters the ID code printed on the prepaid instrument, for example in response to a voice or other prompt from the service provider host computer. Upon receipt of the ID number, the service provider host computer interrogates its database to determine whether sufficient "funds" exist in the account to permit the consumer to make a long distance call. If not, the consumer is informed that his account is fully withdrawn, and invited to purchase a new prepaid card or make other arrangements for paying the long distance charges for this particular call.

If the prepaid account has sufficient funds available to permit a long distance call, the consumer enters the telephone number of his desired destination, for example in response to a voice or other prompt from the host computer. The consumer will then be connected to his destination, and will be permitted to engage in his long distance telephone call until the available funds in his account are depleted.

One of the primary advantages of existing prepaid calling card schemes involves the convenience to the user; that is, the user need only carry the card with him in order to make long distance telephone calls from virtually any telephone. The disadvantage, however, of this scheme is that anyone who comes upon a lost or stolen prepaid card can defraud the consumer of the funds available in the account corresponding to the recovered card, inasmuch as the ID code is printed on the face of the card; consequently, in presently known systems, the consumer typically bears the risk of a lost or stolen card.

A primary advantage associated with the present invention surrounds the ability of the issuer to provide the consumer with a replacement ID code or, alternatively, with reimbursement or credit for a card which is lost or stolen. In accordance with one aspect of the invention, an issuer's ability to provide such credit, reimbursement, or replacement is not predicated on the consumer's ability to recite the ID code on the card; rather, a consumer seeks a replacement for a lost or stolen card based on a separate replacement code which is printed on a document which is advantageously decoupled from the prepaid card which bears the ID code. In particular, an exemplary replacement document 106 suitably includes a replacement code printed thereon, which may be retained by the consumer in a place separate from prepaid card 104. If desired, replacement document 106 may also include a name and telephone number which the consumer may use to report lost or stolen prepaid cards.

In order to demonstrate the utility of the present invention, a typical scenario involving the secure replacement scheme of the present invention will now be described.

During manufacture of the prepaid ensemble, the issuer produces prepaid card 104 and replacement document 106, such that the ID code on the prepaid card is related to the replacement code on the replacement document in accordance with a secret relationship known only by the issuer. For example, the ID code and the replacement code may be cryptographically related, or related via a lookup table or other relational scheme maintained at the service provider's host computer. If a tracking number is used on the outside of the envelope within which the prepaid card and replacement document are sealed, the tracking number should also relate to at least one of the ID code and replacement code, for example to permit activation of the account corresponding to the ID code at the appropriate time.

The manufacturer then places prepaid card 104 and replacement document 106 into envelope 102, and seals the envelope prior to shipment to a merchant. By sealing the replacement code within the envelope, the parties in the distribution chain (including the merchant) are unable to detect the replacement code and, hence, merchant fraud and other fraud against the issuer will be substantially impeded. That is, if a merchant were able to detect the replacement code prior to sale of the ensemble to a consumer, the merchant or an employee of the merchant could conceivably call the issuer and request replacement, reimbursement, or the like.

When a consumer desires to purchase a prepaid card, either from a merchant, vending machine, or the like, he simply tenders payment in the form of cash, check, credit card, debit card, or the like to the merchant in exchange for sealed envelope 102. If the merchant has not already paid the issuer for the ensemble, it may be appropriate for the merchant to activate the account upon receipt of payment from the consumer. As discussed above, the merchant may communicate the tracking number which may be printed on the outside of the envelope to the issuer, to thereby cause the issuer to activate the account corresponding to the card within the envelope.

Alternatively, prepaid calling cards and associated replacement instruments may be distributed by organizations in connection with sales and marketing promotions, or the cards may be placed into the hands of consumers for virtually any other reason and in virtually any other distribution modality.

Once a consumer is in possession of prepaid card 104 and replacement card 106, the consumer should desirably retain the replacement instrument in a secure place remote from the calling card. Thus, if calling card 104 is lost or stolen, the person coming upon the calling card will not have access to the replacement code. Indeed, if the thief or finder of the calling card (or even the consumer or merchant) attempts to report the card as stolen based on the ID card alone, the issuer may in its discretion cancel or otherwise deactivate the account; however, the issuer in accordance with the present scheme would preferably not grant a replacement, issue credit, or issue a refund to a party having only possession of the ID code; rather, only the person in possession of the replacement code would be entitled to a refund, reimbursement, or replacement. As briefly stated above, since the replacement code was obscured from the merchant until the card was purchased by a consumer, not even the merchant has access to the replacement code. Consequently, only the consumer rightfully in possession of the replacement code can properly request a refund or reimbursement. Of course, if the consumer were to also lose his replacement code or have it stolen, the party in possession of the replacement code could conceivably seek a replacement or refund from the issuer; however, in accordance with one aspect of the present invention, a consumer would be instructed to carry the calling card with him, yet leave the replacement card in a secure place in a home, office, or the like.

Once a consumer has determined that his calling card is lost or stolen, he simply contacts the issuer, for example at a telephone number printed on replacement instrument 106, and reports the replacement code to the issuer. The issuer may then take any appropriate action, including: issuing a new ID code to the consumer over the phone; sending a new ID code or ID card to the consumer through the mail; crediting the consumer's checking account, credit card, debit card, or the like; or the issuer could even disburse cash to the consumer, either through an ATM machine or by having the consumer visit a satellite office of the issuing entity.

Referring now to FIG. 2, an alternate embodiment of the present invention suitably comprises a "receipt" 202 of the type which may be conveniently printed by an ATM machine, a POS terminal, and the like. In this regard, reference is hereby made to copending U.S. patent application Ser. No. 08/456,525 by inventor John M. Taskett, filed substantially contemporaneously herewith, the entire disclosure of which is incorporated herein by this reference.

With continued reference to FIG. 2, an alternate modality of issuing secure calling cards involves printing instrument 202, for example in response to an interactive request from a consumer, at an ATM. As shown in FIG. 2, instrument 202 suitably comprises instructions printed thereon for effecting long distance telephone calls or, indeed, for exploiting the prepaid account in any desirable context, for example in the context of goods, the provision of services, or the like. In the context of the prepaid calling card shown in FIG. 2, the information needed by the consumer to effect long distance phone calls is set forth. In particular, an authorization code (analogous to the ID code shown in FIG. 1B) is set forth, which is different from the replacement code set forth at the bottom of instrument 202. In this way, the ATM, POS terminal, or any other convenient dispensing device need only print a single sheet of paper, which the consumer may conveniently detach at dotted (or perforated) line 203. Upon decoupling the replacement code portion from the rest of instrument 202, the replacement code portion may be maintained by the consumer in a secure place remote from instrument 202, which would presumably be carried by the consumer just as any other prepaid calling card would be. In the event the prepaid calling card portion is lost or stolen, the consumer would then retrieve his replacement code portion, and contact the issuer as described above.

Figure 3:
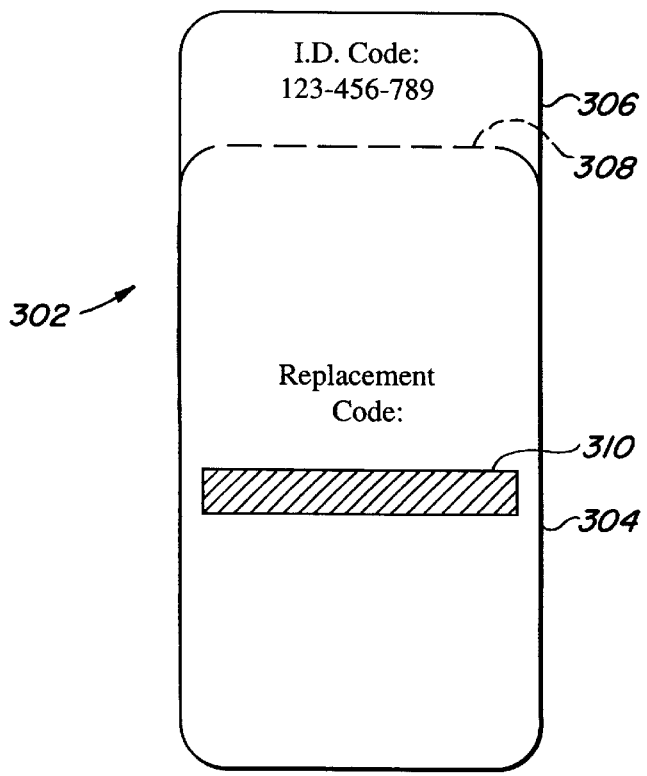
FIG. 3 is a prepaid card bearing an ID code shown removably attached to the replacement instrument.

Referring now to FIG. 3, a further alternative embodiment of the present invention suitably comprises a composite ensemble 302, comprising an ID code portion 306 and a replacement code portion 304, for example separated by a dotted, perforated, or other suitable separating mechanism 308. In the embodiment shown in FIG. 3, the replacement code is advantageously obscured, for example by a scratch off or other masking surface 310.

In accordance with one aspect of the alternate embodiment shown in FIG. 3, a sealed envelope is not necessary, inasmuch as the replacement code may be concealed from the merchant and, indeed, from anyone else in the chain of distribution, until such time as composite ensemble 302 is purchased by a consumer. In this regard, purchasers should be instructed not to purchase an ensemble if the replacement code is visible. In this way, merchant fraud against the issuer may be substantially reduced.

Upon purchasing a composite ensemble 302, for example from a vending machine, merchant, or the like, the consumer simply detaches the replacement code portion 304 from the prepaid calling portion 306, and stores the replacement code in a secure place. Calling card portion 306, analogous to prepaid card 104 in FIG. 1B, may then be carried by the consumer and used as described above. In the event calling portion 306 is lost or stolen, the consumer may then retrieve replacement portion 304, scratch off surface 310 to reveal the replacement code, and contact the issuer for a replacement, reimbursement, or the like.

A further advantage associated with the embodiment shown in FIG. 3 surrounds the elimination of the need for a separate tracking number, as shown in FIG. 1. Recall that the tracking number in the embodiment shown in FIG. 1 is advantageously used to permit the merchant to activate the account upon sale of the ensemble to a consumer, while keeping the replacement code masked from the merchant to prevent merchant fraud. In the embodiment shown in FIG. 3, the replacement code is physically masked from the merchant until composite ensemble 302 is purchased by a consumer; hence, the need for a sealed envelope is substantially eliminated. Moreover, since the replacement code remains obscured from the merchant notwithstanding the absence of a sealed envelope, the ID code itself could be used to activate the account. Once the account is activated, the account may be used by anyone in possession of the ID code, including the merchant and anyone else in the chain of distribution. Hence, from an issuer standpoint, the embodiment shown in FIG. 3 would be particularly appropriate in circumstances wherein the issuer receives payment for the ensemble at the time it leaves the issuer's possession, for example in vending machine applications, and the like.

Alternatively, composite ensemble 302 may also include a tracking number (not shown) which is different from the I.D. code and the replacement code. In this instance, it may be desirable to also obscure the I.D. code, for example through the use of a scratch off service, to further insulate the issuer from merchant fraud. By placing a tracking number directly on the surface of the ensemble, packaging and distribution costs may be minimized since all three relevant numbers (I.D. code, the replacement code, and the tracking number) all appear on a single, although perhaps perforated, piece of paper or cardboard.

Regardless of the particular manner in which the calling card and replacement document are packaged, i.e., whether in the form shown in FIG. 1, FIG. 3 or otherwise, it may also be desirable to include some sort of Purchase Application Form (PAF) which sets forth some of the terms and conditions of sale and, more particularly, the terms and conditions which govern replacement or refund of the calling card if it is lost. More particularly, conventional travelers checks often include as part of the purchase documentation a PAF which sets forth the general parameters for replacement of the travelers checks. For example, PAF may state that the calling card will be refunded by the issuer only if certain conditions are met, such as a requirement that the consumer keep the replacement document in a place separate from the calling card, so that if the replacement document is also lost or stolen along with the card, the issuer is relieved of responsibility for replacement, refund, and the like. It would also be desirable for the PAF to include those terms and conditions which would limit the issuer's obligations to replace or refund, for example if the consumer fails to call within a specified period of time from the date of loss or theft of the calling card.

In the context of the present invention, such a PAF could be printed directly on the composite ensemble (FIG. 3), printed on the outside envelope (FIG. 1), or may comprise a separate sheet of paper which is separable from either the calling card, the replacement document, or any other convenient manner.

Finally, it will be understood that one of the functions of the replacement code as discussed herein is to provide the issuer with sufficient indicia of reliability that the calling card was in fact lost and/or stolen, and that the consumer desires replacement or a refund. However, virtually any criteria or any sufficient indicia of creditability may be employed by an issuer to prove to the issuer's satisfaction that the consumer who is reporting the theft/loss is the rightful owner of the calling card. For example, even if the replacement code is lost or not conveniently retrievable by the consumer, if the consumer can otherwise show that he was likely the purchaser of the card, the issuer may nonetheless desire to grant a refund or replacement. For example, if the consumer is traveling on vacation, yet his replacement document is at his home or office, it may be sufficient for the consumer to explain to the issuer where and when the calling card was purchased, giving the issuer a sufficiently reliable basis upon which to predicate a refund or a replacement.

Although the subject invention has been described herein in conjunction with the appended drawing figures, the scope of the invention is not so limited. For example, many of the concepts herein may be implemented in the context of a prepaid calling card having a local memory component. For example, information regarding account balance and perhaps other useful information relating to the account may be stored directly on the card, for example in a ram, microprocessor, or the like. In such instances, it may still be possible to maintain a central database at the host computer relating to such parameters as the remaining balance available for the card, or it may be sufficient to simply decode the local memory on the card each time the card is used to make long distance telephone calls. In circumstances where communication is established with the host computer each time the card is used, even cards having a local memory component may be effectively "cancelled" if they are lost or stolen, inasmuch as the host computer would nonetheless authorize use of a card each time or at least be in a position to prevent an unauthorized use. If, on the other hand, a scheme is adopted which does not require communication with the host computer before a card is used, it may be desirable to "broadcast" a cancellation message to all sites (or certain of them) upon receipt the card issuing company of a request to cancel the account. In this way, if a card having local memory is cancelled, the terminal with which the card is used may be configured to refuse to accept the card if the terminal has received a message that the card has been cancelled. There are other modifications in the arrangement of the components discussed and the steps described herein for using various embodiments of the secured prepaid calling card schemes discussed herein may be made without departing from the spirit and scope of the invention as set forth in the appended claims.

I claim:

1. A prepaid calling card ensemble, comprising:

a calling card having printed thereon an ID code which is to be entered by a consumer onto a telephone keypad to thereby gain access to a prepaid telephone account associated with said ID number;

a replacement document, physically decoupled from said calling card, having printed thereon a replacement code which is different from but related to said ID code in accordance with a relationship maintained in secret by the issuer of said calling card;

wherein said calling card and said replacement document are securely disposed within a sealed envelope until purchased by a consumer; and wherein said replacement document is originally attached to said calling card before being decoupled.

2. The prepaid calling card ensemble of claim 1 wherein said replacement document is dispensed from at least one of an ATM machine and a POS terminal.

3. The prepaid calling card ensemble of claim 1 further comprising a tracking number for activating said prepaid telephone account, said tracking number relating to said replacement code.

4. The prepaid calling card ensemble of claim 3 wherein said tracking number is printed on said sealed envelope.

5. The prepaid calling card ensemble of claim 1 wherein said replacement document comprises a telephone number corresponding to the issuer of said calling card.

6. The prepaid calling card ensemble of claim 1 wherein said replacement code is obscured by a masking surface.

7. The prepaid calling card ensemble of claim 1 further comprising a purchase application form for setting forth to said consumer terms governing the replacement or refunding of said calling card if it is lost.

8. The prepaid calling card ensemble of claim 7 wherein said purchase application form is printed on at least one of said calling card and said replacement document.

9. The prepaid calling card ensemble of claim 1 wherein said calling card further comprises a local memory mechanism for storing information relating to said calling card.

10. A prepaid calling card comprising:

a first portion including a unique identification code associated with said calling card and wherein said identification code is used by a consumer to gain access to a prepaid telephone account associated with said identification code; and a second portion including a replacement code which is related to said identification code in accordance with a relationship maintained secretly by an issuer of said calling card;

wherein said replacement code is useful by a consumer to obtain from said issuer a replacement card when said prepaid calling card is lost; and wherein said second portion is removably attached to said first portion.

11. The prepaid calling card of claim 10 wherein said second portion is dispensed from at least one of an ATM machine and a POS terminal.

12. The prepaid calling card of claim 10 further comprising a tracking number for activating said prepaid telephone account, said tracking number relating to said replacement code.

13. The prepaid calling card of claim 12 further comprising an envelope for securely disposing said calling card until said calling card is purchased by said consumer and wherein said tracking number is printed on said envelope.

14. The prepaid calling card of claim 10 wherein said second portion is attached to said first portion via a perforated line.

15. The prepaid calling card of claim 10 wherein said second portion is a distinct document not attached to said first portion.

16. The prepaid calling card of claim 10 wherein said second portion comprises a telephone number for permitting said consumer to contact said issuer to report a lost calling card.

17. The prepaid calling card of claim 10 wherein said replacement code is hidden from a merchant by a masking surface.

18. The prepaid calling card of claim 10 further comprising a purchase application form for setting forth to said consumer terms governing said calling card replacement.

19. The prepaid calling card of claim 18 wherein said purchase application form is printed on said second portion.

20. A method for distributing by an issuer a prepaid transaction instrument to a consumer, comprising the steps of:

issuing to the consumer a first transaction instrument, said first transaction instrument having an identification code associated with said first transaction instrument for providing access to a transaction account, and a replacement code which is related to said identification code in accordance with a secret relationship maintained by the issuer; and issuing a second transaction instrument to the consumer when the consumer notifies the issuer of said replacement code and that said first transaction instrument is lost; and wherein said replacement code is removably attached to said first transaction instrument.

21. The method of claim 20 wherein said first and second transaction instruments are dispensed by an ATM machine.

22. The method of claim 20 wherein said first transaction instrument is issued to the consumer in a sealed envelope, said sealed envelope comprising a tracking number for activating said first transaction instrument.

23. The method of claim 20 wherein said first and second transaction instruments are prepaid telephone cards.

* * * * *